(12) United States Patent
Black et al.

(10) Patent No.: US 6,680,968 B2
(45) Date of Patent: Jan. 20, 2004

(54) CDMA SEARCHER WITH TIME OFFSET COMPENSATION

(75) Inventors: Peter J. Black, San Diego, CA (US); Jurg Hinderling, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 48 days.

(21) Appl. No.: 09/860,869

(22) Filed: May 17, 2001

(65) Prior Publication Data

US 2002/0181548 A1 Dec. 5, 2002

(51) Int. Cl.[7] .............................................. H04B 1/707
(52) U.S. Cl. ........................................ 375/149; 375/150
(58) Field of Search ................................ 375/134, 137, 375/142, 145, 149, 150; 370/320, 335, 342

(56) References Cited

U.S. PATENT DOCUMENTS

| | | |
|---|---|---|
| 5,101,390 A | 3/1992 | Kuwabara |
| 6,201,828 B1 | 3/2001 | El-Tarhuni et al. |
| 6,445,728 B1 * | 9/2002 | Byun ........................ 375/142 |
| 2002/0106007 A1 * | 8/2002 | Lomp et al. ................ 375/147 |

FOREIGN PATENT DOCUMENTS

DE          19609324 A1      9/1997

* cited by examiner

Primary Examiner—Amanda T. Le
(74) Attorney, Agent, or Firm—Philip R. Wadsworth; Kent D. Baker; Thomas R. Rouse (57) ABSTRACT

Techniques for increased pilot detection accuracy are disclosed, which provide the benefits of increased acquisition speed, increased data rate, decreased power, and improved overall system capacity. In one aspect, pilot energy calculations corresponding to PN offsets surrounding the PN offset of a local pilot energy maximum are combined with that local pilot energy maximum resulting in a compensated, more accurate local pilot energy maximum. In another aspect, the combination of nearby energy calculations is combined with the local pilot energy maximum via a function with pre-calculated compensation factors. The pre-calculated compensation factors can be determined to minimize mean-squared error in the resultant compensated local pilot energy maximum. These factors can be calculated based on a matched filter. The techniques described herein apply equally to both access points and access terminals.

29 Claims, 6 Drawing Sheets

CDMA SEARCHER WITH TIME OFFSET COMPENSATION

BACKGROUND

1. Field

The present invention relates generally to communications, and more specifically to a novel and improved method and apparatus for pilot signal acquisition.

2. Background

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (5) some other standards. These standards are incorporated herein by reference. A system that implements the High Rate Packet Data specification of the cdma2000 standard is referred to herein as a high data rate (HDR) system. The HDR system is documented in TIA/EIA-IS-856, "cdma2000 High Rate Packet Data Air Interface Specification", and incorporated herein by reference. Proposed wireless systems also provide a combination of HDR and low data rate services (such as voice and fax services) using a single air interface.

Pseudorandom noise (PN) sequences are commonly used in CDMA systems for spreading of transmitted data, including transmitted pilot signals. CDMA receivers commonly employ RAKE receivers, described in U.S. Pat. No. 5,109,390 entitled "DIVERSITY RECEIVER IN A CDMA CELLULAR TELEPHONE SYSTEM", assigned to the assignee of the present invention and incorporated herein by reference. A rake receiver is typically made up of one or more searchers for locating direct and multipath pilots from neighboring base stations, and two or more multipath demodulators (fingers) for receiving and combining information signals from those base stations. Searchers are described in co-pending U.S. patent application Ser. No. 08/316,177, entitled "MULTIPATH SEARCH PROCESSOR FOR SPREAD SPECTRUM MULTIPLE ACCESS COMMUNICATION SYSTEMS", filed Sep. 30, 1994, and co-pending U.S. patent application Ser. No. 09/283,010, entitled "PROGRAMMABLE MATCHED FILTER SEARCHER", filed Mar. 31, 1999, both assigned to the assignee of the present invention and incorporated herein by reference.

Inherent in the design of direct sequence CDMA systems is the requirement that a receiver must align its PN sequences to those of the base station. The time required to transmit a single value of the PN sequence is known as a chip, and the rate at which the chips vary is known as the chip rate. For example, in IS-95, each base station and subscriber unit uses the exact same PN sequences. A base station distinguishes itself from other base stations by inserting a unique time offset in the generation of its PN sequences. In IS-95 systems, all base stations are offset by an integer multiple of 64 chips. A subscriber unit communicates with a base station by assigning at least one finger to that base station. An assigned finger must insert the appropriate offset into its PN sequence in order to communicate with that base station. It is also possible to differentiate base stations by using unique PN sequences for each rather than offsets of the same PN sequence. In this case, a finger would adjust its PN generator to produce the appropriate PN sequence for the base station to which it is assigned.

In searcher design, an increased sampling rate of the incoming signal translates to finer time resolution and hence a better result in terms of PN space search accuracy is achieved. However, those better results typically come with a trade-off of increased computation time or increased complexity, or both. An established practice is to provide samples of the incoming received signal to the searcher at a resolution of twice the chip rate. As such, when performing search calculations to determine the location of a pilot, there is always uncertainty of one half chip in the alignment between the PN sequence being generated at the receiver and the PN sequence embedded in the received signal.

The effect of this misalignment in pilot acquisition is that energy calculations for a given hypothesis offset being tested may actually under-report the true energy at that offset. For example, if there is a quarter-chip discrepancy between timing of the received PN sequence and the PN sequence generated for correlation with it, there will still be energy detected, but it will be substantially less than the actual energy available for receiving a signal at that offset. As a result, a valid pilot may not register enough energy to exceed a programmed threshold and therefore may be ignored. This may lead to selection of sub-optimal multipath signals depending on the relative size of the offset error. In the system context, the under-reported energy translates into increased mean time of search acquisition and as a result data rate and capacity suffer. To compensate for these ill effects, the system may need to be over-engineered. There is therefore a need in the art for improved pilot energy calculation techniques to more accurately detect pilot signals for increased acquisition performance.

SUMMARY

Embodiments disclosed herein address the need for increased pilot detection accuracy. In one aspect, pilot energy calculations corresponding to PN offsets surrounding the PN offset of a local pilot energy maximum are combined with that local pilot energy maximum resulting in a compensated, more accurate local pilot energy maximum. In another aspect, the combination of nearby energy calculations is combined with the local pilot energy maximum via a function with pre-calculated compensation factors. The pre-calculated compensation factors can be determined to minimize mean-squared error in the resultant compensated local pilot energy maximum. These factors can be calculated based on a matched filter used in conjunction with the disclosed embodiments. These aspects have the benefit of increasing the accuracy of pilot searching, which translates to increased acquisition speed, increased data rate, decreased power, and improved overall system capacity. The techniques described herein apply equally to both access points and access terminals. Various other aspects of the invention are also presented.

The disclosed method and apparatus provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
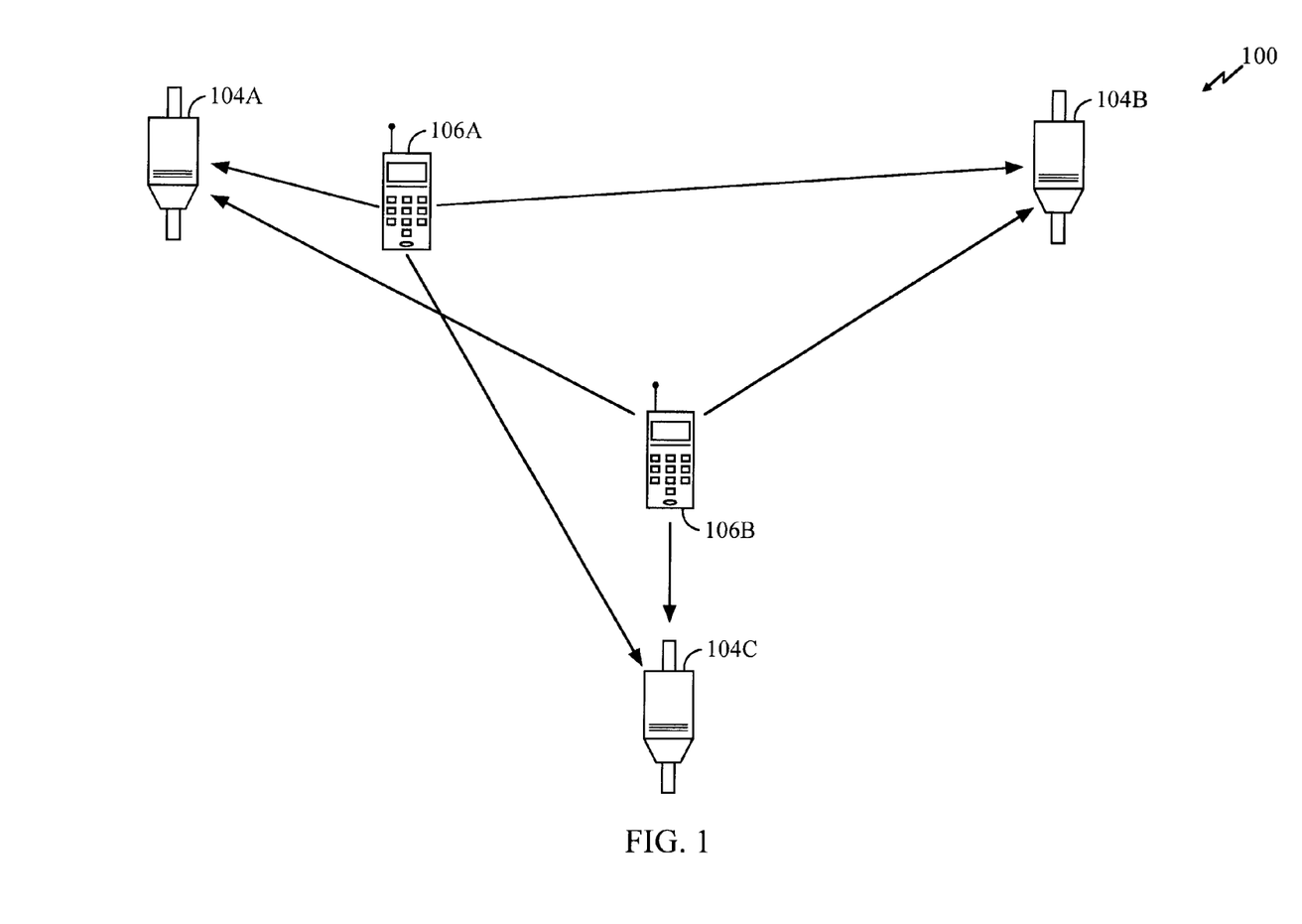
FIG. 1 is a wireless communication system that supports a number of users, and which can implement various embodiments of the invention.

FIG. 1 is a diagram of a wireless communication system 100 that supports a number of users, and which can implement various embodiments of the invention. System 100 may be designed to support one or more CDMA standards and/or designs (e.g., the IS-95 standard, the cdma2000 standard, the HDR specification). For simplicity, system 100 is shown to include three access points 104 (which may also be referred to as base stations) in communication with two access terminals 106 (which may also be referred to as remote terminals or mobile stations). The access point and its coverage area are often collectively referred to as a "cell".

Depending on the CDMA system being implemented, each access terminal 106 may communicate with one (or possibly more) access points 104 on the forward link at any given moment, and may communicate with one or more access points 104 on the reverse link depending on whether or not the access terminal 106 is in soft handoff. The forward link (i.e., downlink) refers to transmission from the access point 104 to the access terminal 106, and the reverse link (i.e., uplink) refers to transmission from the access terminal 106 to the access point 104.

For clarity, the examples used in describing these embodiments will assume access points as the originator of pilot signals and access terminals as receivers and acquirers of those pilot signals, i.e. pilot signals on the forward link. Those skilled in the art would understand that access terminals as well as access points can be equipped to transmit data with a pilot signal as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

A common task to be performed by an access terminal, such as those depicted as 106a and 106b in FIG. 1, is that of pilot acquisition. Acquisition occurs when an access terminal 106 is initially powered on, or for some other reason has to initiate communication with an access point 104. Acquisition also routinely occurs during active communication with an access point, such as the case of a mobile station 106 which is traveling and searching for base stations 104 with which to communicate, or when a remote station's 106 signal from a base station 104 is interfered with, requiring an alternate base station 104 to be located.

During acquisition, searching occurs over the entire PN space, or a subspace thereof. The set of hypotheses searched is typically referred to as a search window. An access terminal 106 performs acquisition by searching out the entire PN space of the PN sequence being used as a pilot signal, and determining the amount of energy received in that pilot and its location, defined as an offset from an internally generated PN reference. In this case the search window is the entire PN space. When searching for a neighboring base station 104, for example, the search window may be a much smaller subspace of the entire PN sequence.

A typical search engine searches out half-chip PN-hypotheses in a preset search window with a given integration length. The energy of the despread signal from several separate search segments can be non-coherently accumulated to keep the coherent integration length within reasonable bounds (e.g., to avoid losses due to frequency offsets). A typical search algorithm works in several stages. For example, a coarse search phase with wider search window and a relatively short overall integration period establishes a rough profile, while one or several subsequent search passes search out the peaks found during the first phase with greater accuracy (e.g., utilizing a narrower search window with a longer integration interval).

The transmitted signal from an access point 104 is likely to arrive at access terminal 106 after reflecting off of numerous obstacles such as hills, buildings, trucks, and the like. The resultant received signal is known as a multipath signal since it is likely to contain components of the original signal which are arriving with time offsets relative to each other due to the different distance each component traveled on its journey. The multipath signal need not contain the direct path component and can be entirely made up of reflected signals. In a soft handoff situation, a mobile station 106 is likely to be non-equidistant from each base station 104 it is communicating with, and therefore the incoming signals from each station are unlikely to be time aligned. The net effect is that even if an access terminal is precisely time-aligned with all the access points (which in itself is unlikely), the timing of the multipath components are not aligned due to the uncertainty of the paths they traveled.

A typical access point transmitter employs a transmit filter to perform pulse shaping. The access terminal receiver therefore typically employs a matched filter to optimally detect those pulses. The ideal filter would be a Rect function. However, since such a time-limited filter has insufficient stop-band characteristics, it is more common to utilize a windowed sinc, raised-cosine, or other impulse response to minimize intersymbol interference and to maximize stop-band suppression. In general, symmetric impulse responses are used in the transmit and receive filters, but the aspects of the present invention are not limited to the use of symmetric filters.

Figure 2A:
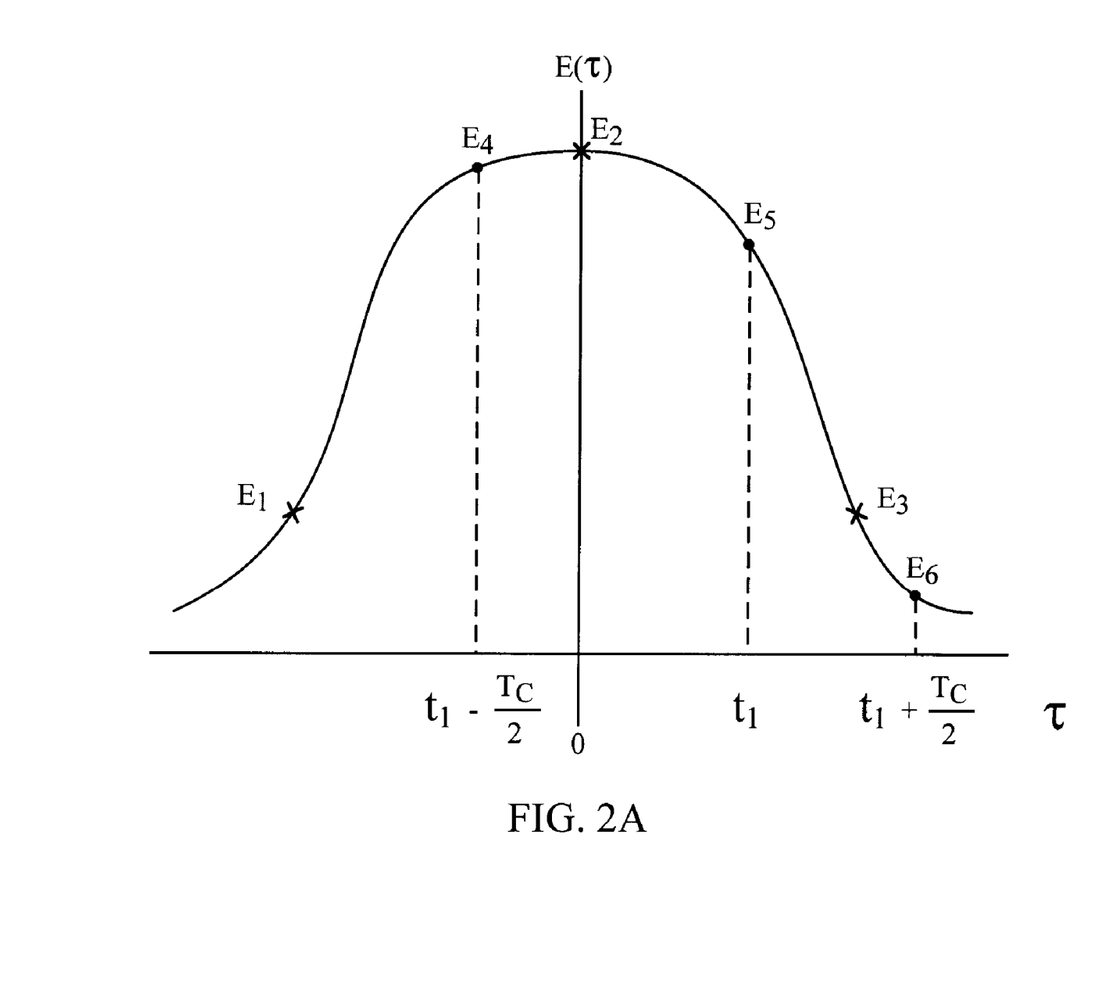
FIG. 2A is a generalized energy function depicting the relationship between received energies and receiver timing offset.

In accordance with one embodiment, the square of the autocorrelation of the matched filter can be used to calculate the received energy as a function of the relative time offset between the transmitter and receiver. FIG. 2A depicts a generalized energy function, $E(\tau)$, of a symmetric pulse-shaping filter. When the receiver and transmitter are perfectly aligned ($\tau=0$), and assuming a sampling rate of twice the chip rate, the energy calculated at the PN offset corresponding to the pilot signal is shown as energy $E_2$, and it is the maximum value. Energies $E_1$ and $E_3$ correspond to the energies calculated at that maximum offset plus and minus one half chip ($T_c/2$), respectively ($\tau=T_c/2$ and $-T_c/2$, respectively). Since $E(\tau)$ is symmetric, $E_1=E_3$. When a time offset, $\tau=\tau_1$, is introduced, however, the energy calculated corresponding to the pilot PN offset is now $E_5$. While $E_5$ may still correctly identify a maximum energy thus successfully identifying the incoming pilot signal, it is notably less than the true received energy at that offset which is given by $E_2$. Note further that the energies calculated at one-half chip intervals prior to and after energy $E_5$, $E_4$ and $E_6$ respectively, are no longer equal. In this example $E_4$ is greater than $E_6$. In order to maximize search performance, and hence to optimize system capacity and power consumption, it is desirable to minimize the discrepancy between the true energy received at a particular PN offset and the energy calculated at that offset, which may be lower due to timing misalignment between the receiver and transmitter. This error can be reduced by factoring in the relationship between the earlier and later energies. In this example, when the timing alignment was correct, the early and late energies, $E_1$ and $E_3$ respectively, were equal, indicating that $E_2$ (the on-time energy) was the peak. When the timing alignment was incorrect, the early energy $E_4$ was greater than the late energy $E_6$, indicating that the recorded energy $E_5$ was less than the true received energy (which of course was equal to $E_2$). For any given pulse-shaping filter, parameters can be calculated which can be used to process the early, late, and on-time energies to minimize the error in the calculated received maximum energy. In this example, a combination of energies $E_4$ and $E_6$ can be added to energy $E_2$ to produce a more accurate reading of the energy at the PN offset corresponding to energy $E_2$. In general, any number of adjacent energies to the maximum detected energy can be combined to reduce the error in the maximum detected energy. Further details on this process are given below.

Figure 2B:
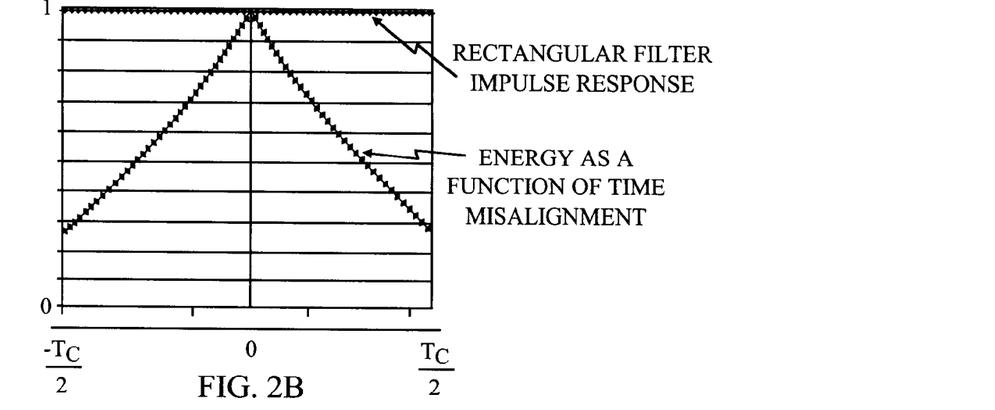
FIGS. 2B, 2C and 2D are plots of impulse responses and energy outputs for a rectangular, sin(x)/x filter and a triangular filter, respectively.
Figure 2C:
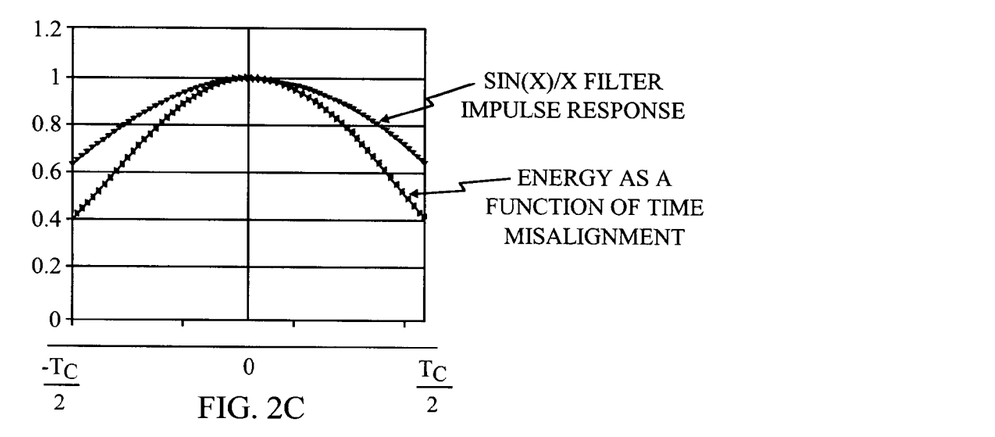
Figure 2D:
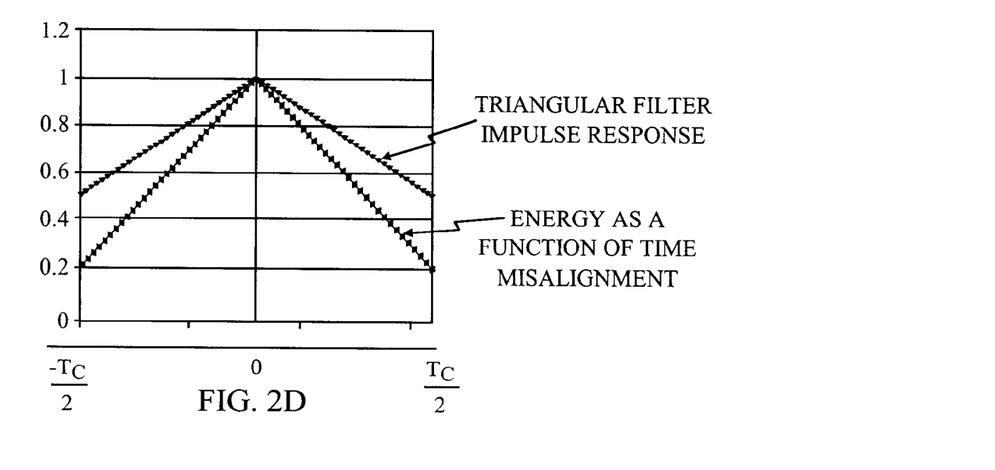

FIGS. 2B, 2C and 2D show characteristics for other filters. The impulse response is plotted, as well as a graph of the energy output of the filter as a function of time misalignment. Those skilled in the art will note that these examples also lend themselves to manipulation of the early, late, and on-time energies in the same manner just discussed, as the corresponding energy output declines as a time misalignment in either direction is introduced. FIG. 2B shows a rectangular filter impulse response and the corresponding energy output as a function of time misalignment. FIG. 2C shows a filter with a sin(x)/(x) impulse response and the corresponding energy output as a function of time misalignment. FIG. 2D shows a filter with a triangular impulse response, and the corresponding energy output as a function of time misalignment. These filters are examples only, and those skilled in the art will be readily able to apply these principles to an unlimited number of different filter types. Note again that the impulse response need not be symmetrical to benefit from the various techniques disclosed herein.

Figure 3:
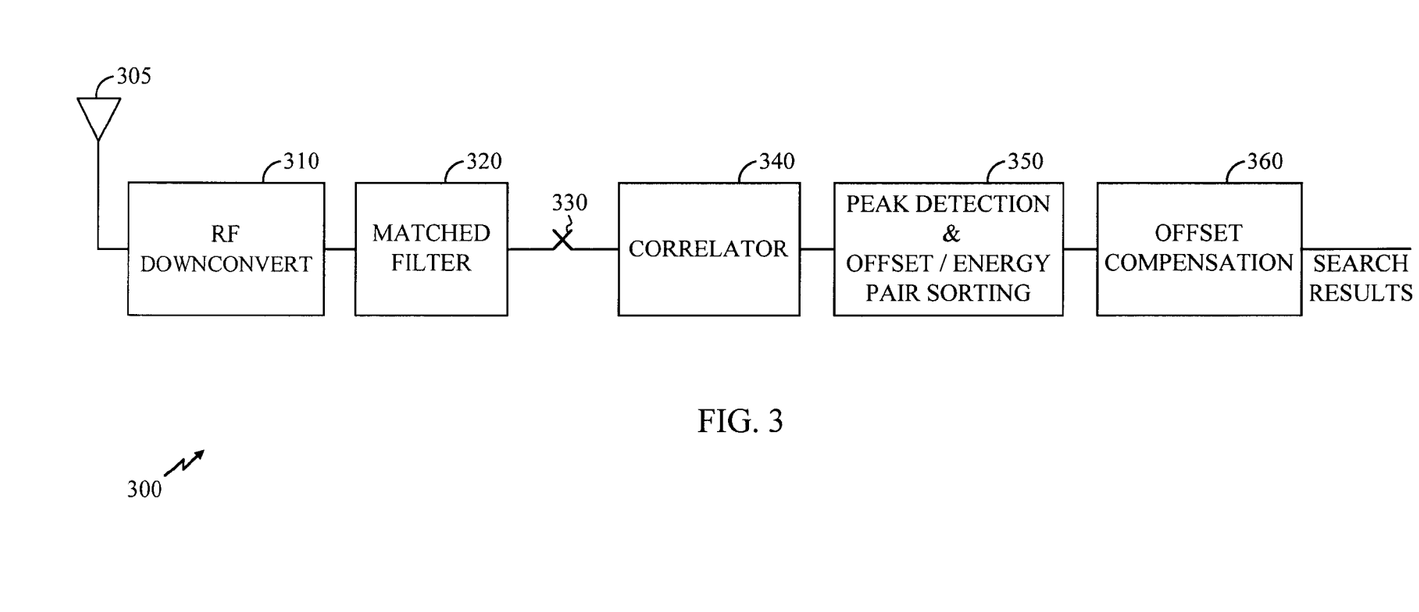
FIG. 3 is a block diagram of an embodiment of an access terminal receiver, in accordance with various embodiments of the invention.

FIG. 3 depicts access terminal receiver 300 in accordance with one embodiment. For simplicity, only the portions of the receiver 300 portraying aspects of the present invention are shown. A received signal from an access point (not shown) is received at antenna 305 and delivered for downconversion to baseband in RF downconvert block 310. The baseband signal is filtered in matched filter 320. This matched filter is typically matched to a pulse shaping filter in the transmitter of the access point, as described with respect to FIG. 2 above. The matched filter output is sampled in sampler 330 for delivery to correlator 340. In the example above, the sampling rate was twice the chip rate, but naturally the system designer is free to choose any sampling rate and still apply the various aspects of the present invention. It will be clear to those skilled in the art that these functional blocks are delineated for clarity only, and that the order of the processing, and whether it is done in digital or analog form, can be varied according to commonly known signal processing techniques. Correlator 340 produces energy calculations corresponding to correlations between the received pilot signal and offsets in the PN sequence generated therein. These energy/offset pairs are delivered for peak detection and offset/energy pair sorting in block 350.

Conventionally, the pairs would be sorted and the maximum energy offsets would have fingers of a RAKE receiver (not shown) assigned to those offsets, or perhaps additional searching performed at those offsets to increase the accuracy of those results. One embodiment of the present invention introduces offset compensation block 360 after peak detection and offset/energy pair sorting block 350. Offset compensation block 360 minimizes the error in the peak energies reported, and therefore the final sorted search results are more accurate and lead to improved search and system efficiency. In some instances, offset compensation block 360 could alternatively be inserted between correlator 340 and peak detection and offset/energy pair sorting block 350. In this case, offset compensation is performed on all the offset/energy pairs, rather than on the peaks alone. For convenience, an access terminal has been described, but these techniques apply with equal force to a receiver in an access point, or base station.

Figure 4:
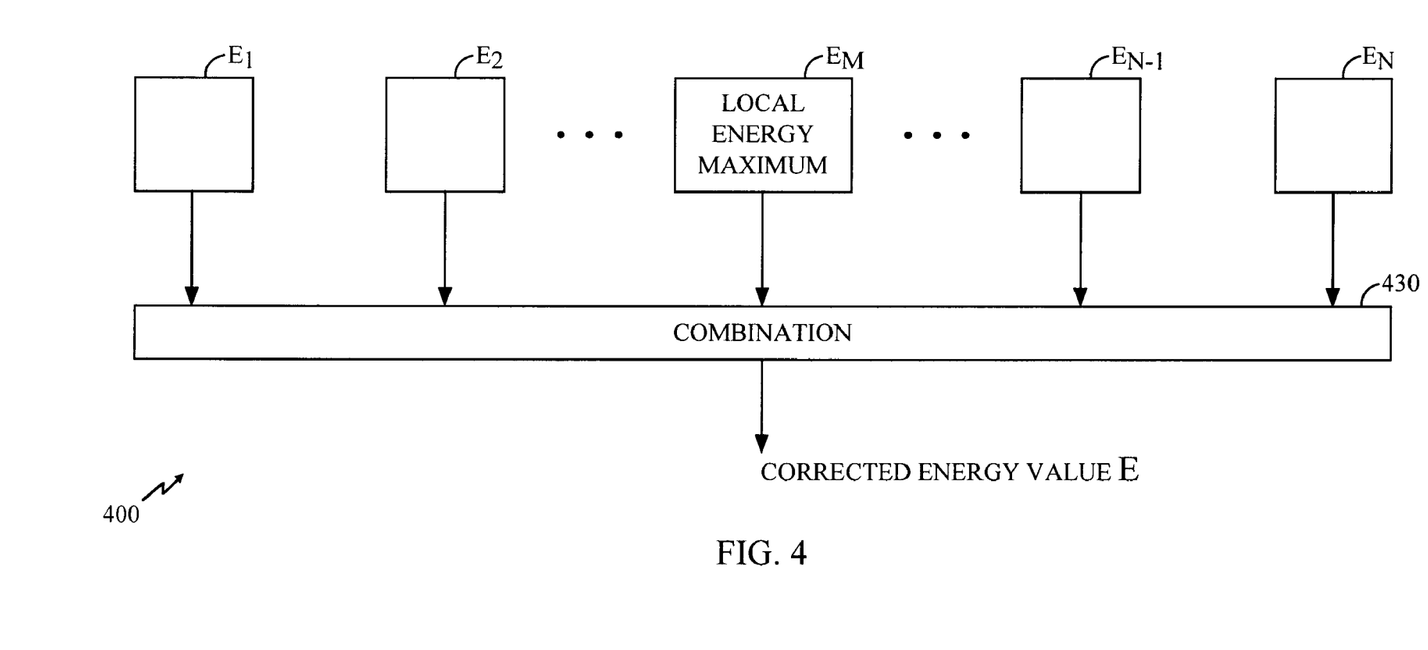
FIG. 4 is a generalized embodiment of an offset compensation block.

FIG. 4. depicts a generalized offset compensation block 400 configured in accordance with the one embodiment, and is one embodiment of offset compensation block 350 described above in reference to FIG. 3. The generalized embodiment of offset compensation block 400 contains N correlation results corresponding to N different offsets, depicted as blocks $E_1$–$E_N$. A local energy maximum is depicted as block $E_M$. For symmetrical impulse responses, the typical embodiment will deploy $(N-1)/2$ energy calculations earlier than the peak, $E_M$, and $(N-1)/2$ calculations later than the peak. In these cases it is optimal for N to be odd, but those skilled in the art will recognize that this is not mandatory. For non-symmetric impulse responses, the principles of this embodiment hold regardless of where peak energy calculation $E_M$ resides in terms of offset in relation to the other energy calculations $E_1$–$E_N$. The resultant energy calculations $E_1$–$E_N$ are delivered to combination block 430, where they are combined in such a way as to minimize the error in the peak energy value in the mean-squared sense. It would be understood by those of skill, that any technique for minimizing the error could be used. The technique need not be restricted to minimizing mean-square error. This corrected energy value is given as E in equation 1 below:

$$E = f(E1, E2, \ldots E_N; a_1, a_2, \ldots a_N) \quad (1)$$

In this equation, function f is chosen, along with variables $a_1$–$a_N$, such mean-squared error is minimized in E. Alternate function f and sets of variables $a_1$–$a_N$ can be determined if error minimization other than the mean-squared sense is desired.

One generalized function f that can be employed for symmetric impulse response filters, and pairs of energy values surrounding the peak energy value, is as follows. Denote the peak energy value as $E_{MAX}$ and M pairs of energy values surrounding $E_{MAX}$ as $E_1$, $E_{-1}$ through $E_M$, $E_{-M}$ respectively. Then variables $a_1$–$a_M$ can be pre-calculated to minimize error according to the function given in equation 2 below:

$$E = E_{MAX} + a_1|E_1 - E_{-1}| + a_2|E_2 - E_{-2}| \ldots + a_M|E_M - E_{-M}| \quad (2)$$

Depending on the types of receive and transmit filters being utilized, these variables may be solved in closed form. Alternatively, they can be solved utilizing any number of iterative methods commonly known in the art. The offset between the receiver timing and the incoming pilot signal timing is a random process. The minimum mean squared error can be calculated by factoring in the correlation of the transmit and receive filters and the statistical distribution of the time offset introduced by the channel. Typically, the time offset will be uniformly distributed. Naturally, non-uniform distributions can be accounted for as well.

The combination performed in block 430 of FIG. 4 can be implemented using a variety of commonly known techniques: a microprocessor or DSP can be coded to perform the tasks, discrete logic implementing multipliers and adders can be utilized, look up tables or shifters can be substituted for multipliers, and so forth.

Figure 5:
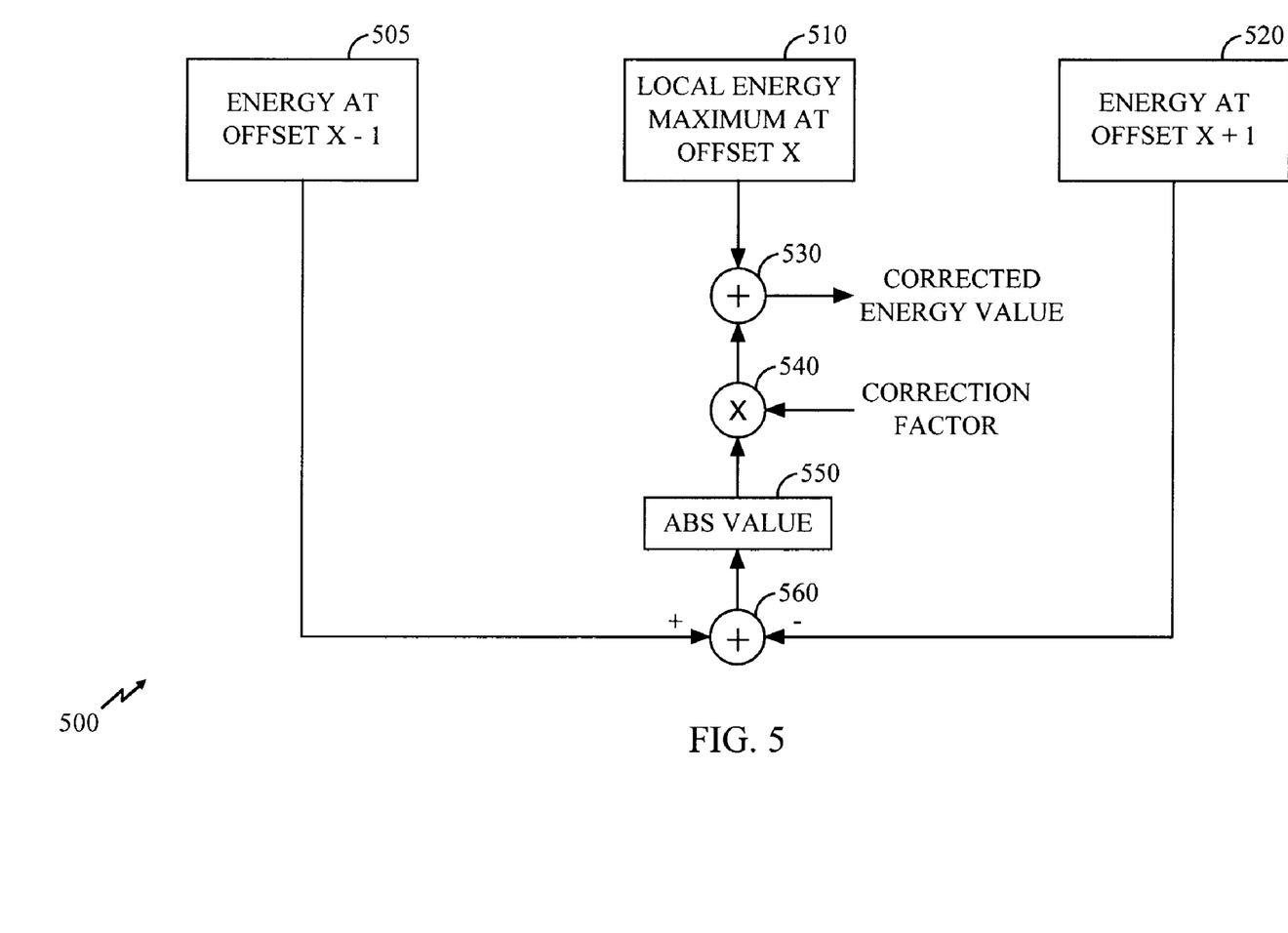
FIG. 5 is a block diagram of an embodiment of an offset compensation block, in accordance with various embodiments of the invention.

FIG. 5 depicts first-order interpolation filter 500, another embodiment of offset compensation block 350 described above in reference to FIG. 3. In this embodiment the difference between the early energy, energy at offset X–1 505, and the late energy, energy at offset X+1 520, is calculated in adder 560. The absolute value of the resultant difference is calculated in abs value 550. The absolute value is scaled by multiplying it times a correction factor in multiplier 540. The scaled absolute value is then added to the local energy max at offset X, denoted by box 510. The result of this addition is the corrected energy value. This embodiment uses only two adjacent energies to compensate the local energy max at offset X. This embodiment is beneficial when use of an additional number of terms would yield only a negligible improvement.

The operation of first-order interpolation filter 500 can be understood in the context of the discussion relating to FIG. 2A above. When the receiver is perfectly time-aligned with the incoming pilot signal, the energies stored on either side of the maximum energy, that is, stored in blocks 505 and 520, will be equal and their difference will be zero. Thus the scaled absolute value will also be zero, and the corrected energy value is simply the calculated local energy maximum stored in block 510. If the timing is off one way or another, there will be a difference produced in adder 560, and the magnitude of that difference will be scaled in multiplier 540 and added to local energy max 510 to produce a corrected energy value that reduces overall error in the mean-squared sense.

In present generation IS-95 systems, as well as HDR systems, searchers employ sort engines, either in hardware or software, to build a list of the best local maxima (in terms of accumulated energies) and their PN offsets. In the procedure just described with respect to FIG. 5, a weighted peak energy correction can be used to mitigate the effects of the timing offset and its loss by reporting an energy value that is much closer to the actual optimal search energy. For any offset within one sampling period of the maximum, the true energy at the peak position is extrapolated.

In another embodiment 24-tap FIR filters which are 2x oversampled are used, similar to those employed in IS-95 and the HDR standard. The sampling rate for the incoming data is twice the chip rate. Over a number of search operations, the offset between transmitter timing and receiver timing can be assumed to be uniformly distributed over the interval of half a PN chip. Table 1 shows the results of calculated energy loss in dB for 4 different correction factors, assuming the uniformly distributed scenario. The correction factors examined for this example are powers of two, which, as is clear to those skilled in the art, provides for multiplication operations being carried out with simple shifting elements. Those skilled in the art will recognize that numerous other filter examples can be optimized using the techniques described herein.

TABLE 1

| Correction Factor | Energy Loss (dB) |
|---|---|
| 0 | 0.37 |
| 0.125 | 0.11 |
| 0.25 | −0.09 |
| 0.5 | −0.49 |

Table 1 shows that the optimal power-of-two correlation factor for this example is 0.25, which almost eliminates the loss due to timing offset error (it slightly overcompensates for the energy loss, by adding 0.09 dB). As shown in the table, without a correction factor, the average energy loss is 0.37 dB. A correction factor of 0.125 reduces the energy loss to 0.11 dB, but it is not optimal. The correction factor of 0.5 overcompensates by 0.49 dB.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system, a method for transmitting a pilot signal from a first entity to a second entity, comprising:
   at the second entity, measuring a local pilot energy maximum corresponding to a first PN offset;
   at the second entity, measuring one or more pilot energies at additional PN offsets; and
   calculating a compensated pilot energy maximum for said first PN offset from said local pilot energy maximum and said one or more pilot energies at additional PN offsets.

2. The method of claim 1 wherein said compensated pilot energy maximum is calculated by:
   calculating the absolute values of differences between pairs of said one or more pilot energies;
   multiplying said absolute values by a plurality of pre-calculated compensation factors to produce one or more compensation factored pilot energies; and
   summing said one or more compensation factored pilot energies with said local pilot energy maximum.

3. The method of claim 2 wherein said plurality of pre-calculated compensation factors are calculated to reduce the mean-squared error in said compensated pilot energy maximum due to timing offsets.

4. The method of claim 3 wherein said plurality of pre-calculated compensation factors are rounded to powers of 2 and said multiplying is accomplished by shifting.

5. The method of claim 2 wherein said plurality of pre-calculated compensation factors are determined based on the characteristics of a matched filter.

6. The method of claim 5 further comprising the step of sorting said compensated local energy maxima and their related PN offsets.

7. In a wireless communication system, a method for transmitting a pilot signal from a first entity to a second entity, comprising:
   at the second entity, measuring a plurality of local pilot energy maxima corresponding to a plurality of PN offsets;
   at the second entity, measuring a plurality of adjacent pilot energies at PN offsets adjacent to said plurality of pilot energy maxima; and
   calculating a plurality of compensated pilot energy maxima for said plurality of PN offsets from said plurality of local pilot energy maxima and said plurality of adjacent pilot energies.

8. The method of claim 7 wherein each of said plurality of compensated pilot energy maxima are calculated by:
   calculating the absolute values of differences between pairs of said adjacent pilot energies;
   multiplying said absolute values by a plurality of pre-calculated compensation factors to produce one or more compensation factored pilot energies; and
   summing said compensated pilot energy maximum with said one or more compensation factored pilot energies.

9. The method of claim 8 wherein said plurality of pre-calculated compensation factors are calculated to reduce the mean-squared error in said compensated received pilot energy maximum due to timing offsets.

10. The method of claim 8 wherein said plurality of pre-calculated compensation factors are rounded to powers of 2 and said multiplying is accomplished by shifting.

11. The method of claim 8 wherein said plurality of pre-calculated compensation factors are determined based on the characteristics of a matched filter.

12. The method of claim 11 further comprising the step of sorting said plurality of compensated pilot energy maxima and their related PN offsets.

13. A method for offset compensation comprising:
    calculating the difference between an energy corresponding to an earlier PN offset and an energy corresponding to a later PN offset;
    taking the absolute value of said difference;
    multiplying the absolute value by a pre-calculated compensation factor; and
    summing the result of said multiplication with a local energy maximum to produce a compensated local energy maximum.

14. The method of claim 13 wherein said pre-calculated compensation factor is rounded to a power of 2 and said multiplying is accomplished by shifting.

15. An access terminal in a wireless communication system, comprising:
    a receiver for receiving a pilot signal and calculating a plurality of received pilot energies corresponding to a plurality of PN offsets; and
    an offset compensation unit for calculating a compensated received pilot energy maximum in response to said received pilot energies.

16. The access terminal of claim 15, wherein said offset compensation unit comprises:
    a plurality of pre-calculated compensation factors;
    a plurality of absolute value calculators for taking the absolute value of differences in pairs of said plurality of received pilot energies;

a plurality of multipliers for multiplying said absolute values with said plurality of pre-calculated compensation factors to produce a plurality of compensation factored received pilot energies; and a summer for adding said plurality of compensation factored received pilot energies to produce said compensated received pilot energy maximum.

17. The access terminal of claim 16, wherein said plurality of pre-calculated compensation factors are calculated to reduce the mean-squared error in said compensated received pilot energy maximum due to timing offsets.

18. The access terminal of claim 17, wherein:

said plurality of pre-calculated compensation factors are rounded to powers of 2; and said multipliers are shifters.

19. An offset compensation unit comprising:

a local energy maximum;

a plurality of adjacent energies;

a plurality of absolute value calculators for calculating the absolute value of differences in pairs of said plurality of adjacent energies;

a plurality of pre-calculated compensation factors;

a plurality of multipliers for multiplying said plurality of adjacent energies with said plurality of pre-calculated compensation factors; and a summer for summing the outputs of said plurality of multipliers and said local energy maximum to produce a compensated local energy maximum.

20. The offset compensation unit of claim 19, wherein said plurality of pre-calculated compensation factors are calculated to reduce the mean-squared error in said compensated local energy maximum due to timing offsets.

21. The offset compensation unit of claim 20, wherein:

said plurality of pre-calculated compensation factors are rounded to powers of 2; and said multipliers are shifters.

22. An access terminal in a CDMA system comprising the offset compensation unit of claim 19.

23. The access terminal of claim 22 further comprising a matched filter and wherein said pre-calculated compensation factors are determined based on the characteristics of said matched filter.

24. The access terminal of claim 23 further comprising a means for sorting said compensated local energy maxima and their related PN offsets.

25. An access point in a CDMA system comprising the offset compensation unit of claim 19.

26. The access point of claim 25 further comprising a matched filter and wherein said pre-calculated compensation factors are determined based on the characteristics of said matched filter.

27. The access point of claim 26 further comprising a means for sorting said compensated local energy maxima and their related PN offsets.

28. The offset compensation unit of claim 25, wherein:

said pre-calculated compensation factor is rounded to a power of 2; and said multiplier is a shifter.

29. An offset compensation unit comprising:

a local energy maximum corresponding to a PN offset;

an energy corresponding to an earlier PN offset;

an energy corresponding to a later PN offset;

an adder for calculating the difference between said energy corresponding to an earlier PN offset and said energy corresponding to a later PN offset;

an absolute value calculator for taking the absolute value of said difference;

a multiplier for multiplying said absolute value by a pre-calculated compensation factor; and an adder for summing the output of said multiplier with said local energy maximum to produce a compensated local energy maximum.

* * * * *